(12) United States Patent
Chen

(10) Patent No.: US 12,352,705 B1
(45) Date of Patent: Jul. 8, 2025

(54) PIPELINE ENDOSCOPIC MECHANISM

(71) Applicant: Shenzhen Sanyi Technology Co., Ltd., Shenzhen (CN)

(72) Inventor: Xiaoquan Chen, Jieyang (CN)

(73) Assignee: SHENZHEN SANYI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/016,157

(22) Filed: Jan. 10, 2025

(51) Int. Cl.
*G01N 21/954* (2006.01)

(52) U.S. Cl.
CPC .................. *G01N 21/954* (2013.01)

(58) Field of Classification Search
CPC ..................................... G01N 21/954
See application file for complete search history.

(56) References Cited

U.S. PATENT DOCUMENTS

| | | | | |
|---|---|---|---|---|
| 4,989,582 | A * | 2/1991 | Sakiyama | A61B 1/042 348/E5.025 |
| 5,754,220 | A * | 5/1998 | Smalser, Sr. | G02B 23/24 348/84 |
| 6,407,909 | B1 * | 6/2002 | Kato | G07G 1/12 361/679.06 |
| 7,546,745 | B2 * | 6/2009 | Lee | F25D 29/005 312/405.1 |
| 10,001,425 | B1 * | 6/2018 | Olsson | G03B 17/561 |
| 11,550,214 | B1 * | 1/2023 | Olsson | H04N 23/50 |
| 2003/0052967 | A1 * | 3/2003 | Brunton | B65H 75/40 348/E7.086 |
| 2004/0242958 | A1 * | 12/2004 | Fujikawa | G02B 23/2476 600/102 |
| 2005/0035262 | A1 * | 2/2005 | Seki | H05K 7/1494 248/441.1 |
| 2011/0108654 | A1 * | 5/2011 | Babb | G03B 37/005 242/405 |
| 2014/0333753 | A1 * | 11/2014 | Chapman | E03F 7/12 74/500.5 |
| 2018/0021015 | A1 * | 1/2018 | Naruse | A61B 8/4427 600/437 |
| 2019/0346330 | A1 * | 11/2019 | Krohlow | F16L 55/30 |
| 2020/0213563 | A1 * | 7/2020 | Morice | G01N 21/8851 |
| 2021/0271046 | A1 * | 9/2021 | Dupuis | G02B 6/504 |
| 2022/0229283 | A1 * | 7/2022 | Qu | G02B 23/2484 |
| 2022/0416528 | A1 * | 12/2022 | Martin | H02G 11/02 |

FOREIGN PATENT DOCUMENTS

| | | |
|---|---|---|
| CN | 215986710 U | 3/2022 |
| CN | 116736516 A | 9/2023 |
| CN | 220523902 U | 2/2024 |
| CN | 221602725 U | 8/2024 |

* cited by examiner

*Primary Examiner* — Fabio S Lima

(57) ABSTRACT

A pipeline endoscopic mechanism, which includes a host, a camera connected to the host via an extension cord, and a base device positioned below the host, wherein the extension cord is wound around the base device, the base device includes a bracket and a meter counter box, and the host includes a box body provided with a receiving groove, a rotating arm positioned at one side of the receiving groove, and a display screen connected to the rotating arm and capable of being unfolded and received in the receiving groove.

20 Claims, 9 Drawing Sheets

PIPELINE ENDOSCOPIC MECHANISM

TECHNICAL FIELD

The present invention relates to the technical field of detection devices, and in particular, to a pipeline endoscopic mechanism.

BACKGROUND

A pipeline detection apparatus is a novel high-tech product designed and produced based on a requirement of detecting inner surfaces of straight pipelines in petrochemical industry, industrial machinery, electronic and electrical industry, aerospace and the like, and integrates optics, mechanics, electronics and image processing software, so that an operator freezes, amplifies, analyzes, measures and prints reports on suspicious points and flaw detection positions in the observed pipeline with the help of a special professional software processing system by using a high-definition color CCD, and the accuracy of determining the flaw detection positions on inner walls of pipelines is greatly improved.

A display screen of a pipeline endoscopic mechanism in the prior art is provided in a box body, which invisibly increases the volume of the box body. In addition, the box body needs to be opened each time the pipeline endoscopic mechanism is used and needs to be closed after use, which is inconvenient to use.

Therefore, it is necessary to provide a pipeline endoscopic mechanism to solve the above technical problem.

SUMMARY

The present invention provides a pipeline endoscopic mechanism, which solves the problems that a pipeline endoscopic mechanism in the prior art is provided in a box body, the volume of the box body is invisibly increased, and the pipeline endoscopic mechanism is inconvenient to use.

To solve the above technical problem, a technical solution of the present invention is as follows: a pipeline endoscopic mechanism, including a host, a camera connected to the host via an extension cord, and a base device positioned below the host, wherein the extension cord is wound around the base device, the base device includes a bracket for fixing the host and a meter counter box connected to the bracket and connected to the host, and the host includes a box body with a receiving groove, a rotating arm with a first end rotatably connected to one side of the receiving groove, and a display screen rotatably connected to a second end of the rotating arm and capable of being unfolded or received in the receiving groove.

According to the present invention, strip-shaped grooves are symmetrically provided on two opposite sides of the receiving groove, the display screen is provided with a fixing column extending into the strip-shaped groove and capable of moving in the strip-shaped groove, and the fixing column is arranged on one side far away from the display screen and connected to the rotating arm.

According to the present invention, the receiving groove is also provided with a first mounting groove, and the first end of the rotating arm is provided with a first rotating shaft connected to a side wall of the first mounting groove and a first return spring connected to the first rotating shaft for pressing the rotating arm towards the receiving groove.

According to the present invention, symmetrical lugs are provided at a connection between the display screen and the rotating arm, and the second end of the rotating arm is provided with a second rotating shaft rotatably connected to the lug and a second return spring connected to the second rotating shaft for pressing the display screen towards the receiving groove.

According to the present invention, the display screen includes a bottom shell, a surface shell connected to the bottom shell, a display component connected to the surface shell, and a first waterproof cotton positioned between the bottom shell and the surface shell.

According to the present invention, the box body includes an upper shell, a lower shell, a control component positioned between the upper shell and the lower shell and partially extending to an outer side of the upper shell and second waterproof cotton positioned between the upper shell and the lower shell, and the receiving groove is positioned in the upper shell.

According to the present invention, the upper shell is provided with a fixing cavity and a limiting component connected in the fixing cavity for clamping the display screen; and the limiting component includes a first spring positioned in the fixing cavity and an abutment block abutting against the first spring, a fixing groove matched with the abutment block is also provided on one side of the surface shell close to the rotating arm, and the abutment block partially extends into the receiving groove when abutting against the display screen.

According to the present invention, the upper shell is also provided with an unlocking key positioned on one side of the limiting component, a fixing plate positioned on one side of the unlocking key, a second spring positioned between the unlocking key and the fixing plate, and an extension block connected to the unlocking key and having one end extending to one side of the abutment block for driving the abutment block to move.

According to the present invention, a first inclined plane is provided on one side of the extension block close to the limiting component; and a fixing block is provided below the abutment block, and a second inclined plane matched with the first inclined plane is provided on one side of the fixing block.

According to the present invention, a waterproof aviation connector is also provided on a rear side of the box body.

According to the present invention, a wire spool capable of rotating in the bracket is also provided in the bracket, and the extension cord is wound on a peripheral side of the wire spool.

According to the present invention, the wire spool includes an upright column connected to the bracket and capable of rotating on the bracket and a fixed disk positioned on a peripheral side of the upright column and fixed on the upright column for winding the extension cord.

According to the present invention, a first mounting plate is also provided in the bracket, and a hollow column is provided on a bottom of the first mounting plate and a bottom of the bracket and is positioned relative to the upright column for rotation.

According to the present invention, a bearing is provided in the hollow column, and the upright column is connected in the bearing.

According to the present invention, a center position of the first mounting plate is recessed towards a bottom of the bracket to form a second mounting groove, and the meter counter box is positioned in the second mounting groove.

According to the present invention, a second mounting plate is also provided on a top of the bracket to limit the meter counter box in the second mounting groove, and the host is fixed on the bracket by the second mounting plate.

According to the present invention, the first mounting plate is provided with a first limiting ring through which the extension cord passes and used to limit the extension cord.

According to the present invention, an outer side of the bracket is also provided with a second limiting ring through which the extension cord passes for limiting the extension cord.

According to the present invention, an outer side of the bracket is also provided with a sleeve sleeved with the camera.

According to the present invention, the sleeve and the second limiting ring are positioned on the same side of the bracket.

Compared with the prior art, the present invention has the following beneficial effects: when the host in the pipeline endoscopic mechanism is unfolded, the rotating arm is rotated, the rotating arm drives one side of the display screen away from the receiving groove, and the other side of the display screen is clamped on a side wall of the display screen, so that the display screen is erected on the receiving groove at an inclined angle; when received, the display screen is folded into the receiving groove, and the rotating arm is lapped on an outer side of the display screen to prevent the display screen from being opened. Through the above structure, the volume of the pipeline endoscopic mechanism can be effectively reduced. Meanwhile, there is no need to overturn the box body during use or close the box body after use, which is more convenient to use.

BRIEF DESCRIPTION OF DRAWINGS

To more clearly illustrate the technical solution in the embodiments of the present invention or in the prior art, the drawings required to be used in the description of the embodiments or the prior art are briefly introduced below. The drawings in the following description are only the corresponding drawings of some embodiments of the present invention.

Figure 1:
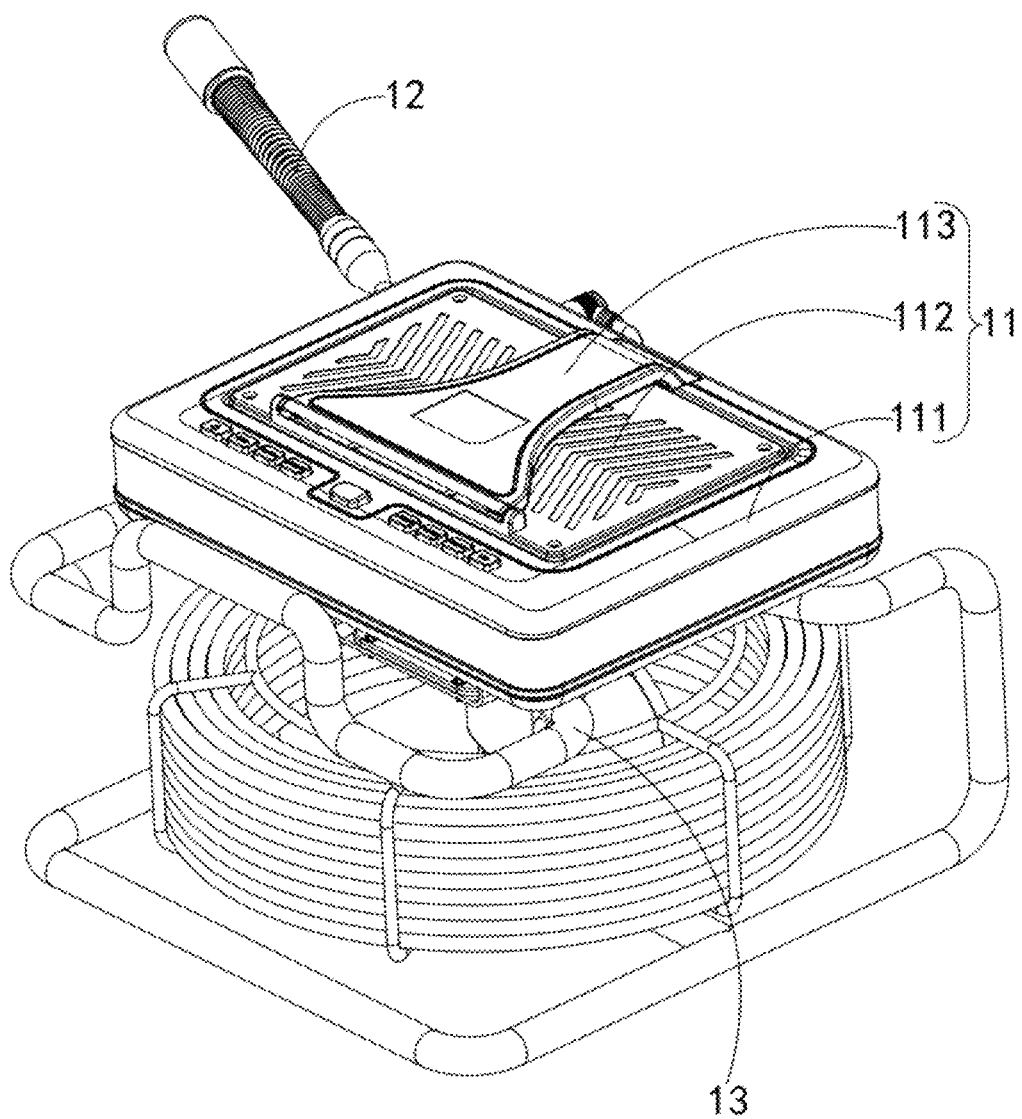
FIG. 1 is a perspective view 1 of a pipeline endoscopic mechanism according to the present invention.

11: host; 12: camera; 13: base device; 111: box body; 112: display screen; 113: rotating arm; 131: bracket; 132: wire spool; 133: meter counter box; 121: extension cord; 1121: surface shell; 1122: bottom shell; 1123: display component; 1124. first waterproof cotton; 1125: fixing groove; 1126: lug; 1127: fixing column; 1321: upright column; 1322: fixed disk; 1111: upper shell; 1112: control component; 1113: lower shell; 1114: limiting component; 1115: strip-shaped groove; 1116: receiving groove; 1117: second waterproof cotton; 1118: first mounting groove; 1119: waterproof aviation connector; 1312: first mounting plate; 1313: second mounting plate; 1314: hollow column; 1315: first limiting ring; 1316: second limiting ring; 1317: sleeve; 1318: second mounting groove; 11151: first spring; 11152: abutment block; 11153: fixing block; 11154: second inclined plane; 1131: first rotating shaft; 1132: first return spring; 1133: second rotating shaft; 1134: second return spring; 151: unlocking key; 152: second spring; 153: extension block; 154: first inclined plane; 155: fixing plate; and 11111: fixing cavity.

DETAILED DESCRIPTION OF EMBODIMENTS

To make objectives, technical solutions, and advantages of embodiments of the present disclosure clearer, the following clearly and completely describes technical solutions in embodiments of the present disclosure with reference to accompanying drawings in embodiments of the present disclosure. It is clear that the described embodiments are merely some but not all of embodiments of the present disclosure. Based on the described embodiments of the present disclosure, all other embodiments obtained by those of ordinary skill in the art without creative efforts fall within the protection scope of the present disclosure.

Unless otherwise defined, the technical terms or scientific terms used herein shall have the ordinary meaning understood by those of ordinary skill in the art to which the present disclosure belongs.

The terms "first", "second", and the like used in the specification and claims of this patent application do not indicate any order, quantity, or importance, but rather are used to distinguish different components. The terms "comprises", "includes", or other similar terms mean that the elements or items listed before "comprises" or "includes" cover the elements or items and equivalents thereof listed after "comprises" or "includes", and other elements or items are not excluded. The terms "connection", "connect to", or other similar terms are not limited to physical or mechanical connections, but may include electrical connections, whether direct or indirect. The terms "upper", "lower", "left", "right", and the like are only used to indicate the relative positional relationship. When the absolute position of the described object changes, the relative positional relationship may also change accordingly.

The following clearly and completely describes the technical solutions in embodiments of the present disclosure with reference to the accompanying drawings in embodiments of the present disclosure. It is clear that the described embodiments are merely a part rather than all of embodiments of the present disclosure. All other embodiments obtained by those skilled in the art based on embodiments of the present invention without creative efforts shall fall within the protection scope of the present invention.

The following is a preferred embodiment of a pipeline endoscopic mechanism provided by the present invention that can solve the above technical problems.

Figure 2:
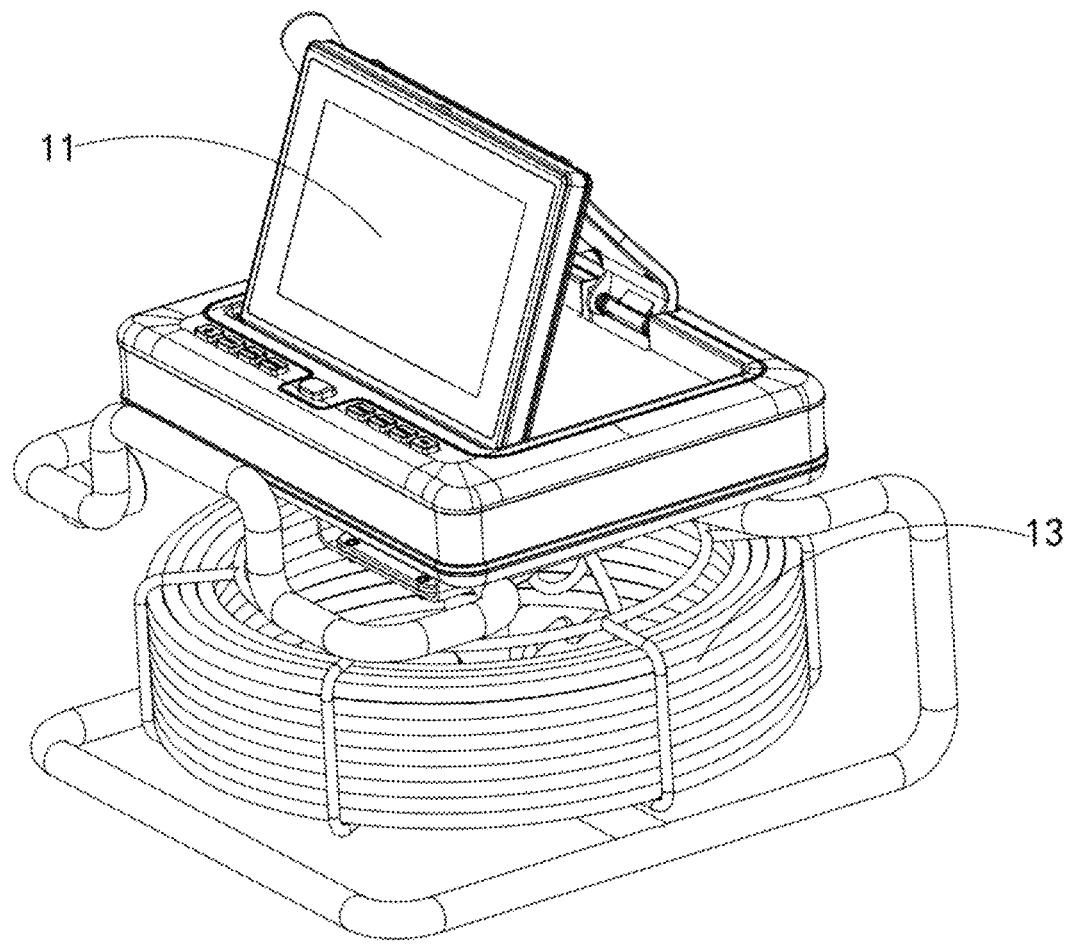
FIG. 2 is a perspective view 2 of a pipeline endoscopic mechanism according to the present invention.
Figure 3:
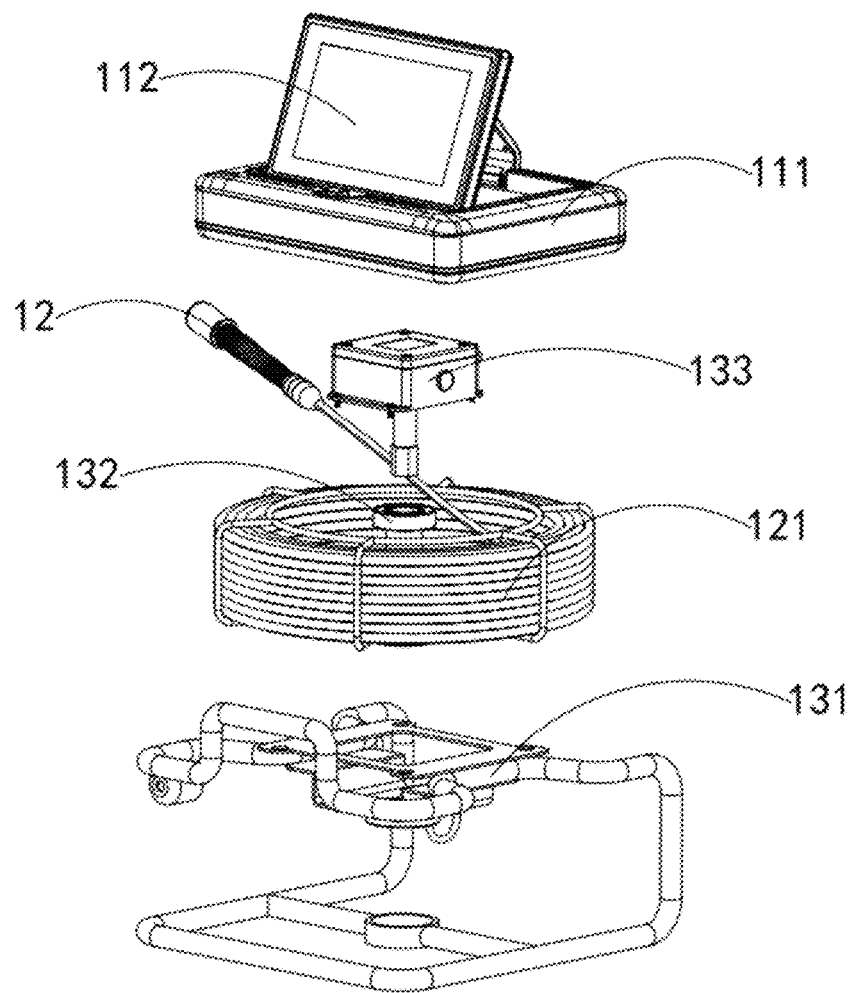
FIG. 3 is an exploded view of a pipeline endoscopic mechanism according to the present invention.

Referring to FIGS. 1, 2 and 3, FIG. 1 is a schematic structural diagram of a preferred embodiment of a pipeline endoscopic mechanism according to the present invention, FIG. 2 is a rear view of a preferred embodiment of a pipeline endoscopic mechanism according to the present invention, and FIG. 3 is a top view of a preferred embodiment of a pipeline endoscopic mechanism according to the present invention.

In the drawings, elements having similar structures are denoted by the same reference numerals.

In the present invention, the terms "first", "second", and the like are merely intended for description, and shall not be interpreted as indicating or implying relative importance, nor as limiting the sequence.

The present invention provides a pipeline endoscopic mechanism, which includes a host 11, a camera 12 connected to the host 11 via an extension cord 121, and a base device 13 positioned below the host 11, wherein the extension cord 121 is wound around the base device 13, the base device 13 includes a bracket 131 for fixing the host 11 and a meter counter box 133 connected to the bracket 131 and connected to the host 11, and the host 11 includes a box body 111 with a receiving groove 1116, a rotating arm 113 with a first end rotatably connected to one side of the receiving groove 1116, and a display screen 112 rotatably connected to a second end of the rotating arm 113 and capable of being unfolded or received in the receiving groove 1116. The camera 12 is used to extend into a pipeline and capture a scene in the pipeline, the host 11 is used to display an image captured by the camera 12 in the pipeline, the base device 13 is used to fix the host 11, the extension cord 121 is used to extend a length of the camera 12, so that the camera 12 can conveniently extend into the pipeline for capturing, and the meter counter box 133 is used to record an extending length of the extension cord 121. When the pipeline endoscopic mechanism is used, firstly, the rotating arm 113 is pulled to enable a first end of the rotating arm 113 to rotate on the box body 111; since a second end of the rotating arm 113 is connected to the display screen 112, when the first end of the rotating arm 113 rotates on the box body 111, the second end of the rotating arm 113 drives one side of the display screen 112 away from the receiving groove 1116, the display screen 112 is far away from the first end of the rotating arm 113 and is clamped on the other side of the receiving groove 1116, the display screen 112 is erected on a side wall of the receiving groove 1116 at an inclined angle, and the camera 12 is extended into the pipeline, so that the camera 12 captures a scene deep in the pipeline; and the captured image is displayed on the display screen 112, so that a user can view the image. After the pipeline endoscopic mechanism is used, one side of the display screen 112 far away from the second end of the rotating arm 113 is close to one side of the first end of the rotating arm 113, and the display screen 112 is folded in the receiving groove 1116; meanwhile, the rotating arm 113 is lapped on an outer side of the display screen 112 to prevent the display screen 112 from being opened. Through the above structure, the display screen 112 is received in the receiving groove 1116 outside the box body 111, so that the volume of the pipeline endoscopic mechanism can be effectively reduced. Meanwhile, there is no need to overturn the box body 111 during use or close the box body 111 after use, so that the use is more convenient.

Strip-shaped grooves 1115 are symmetrically provided on two opposite sides of the receiving groove 1116, the display screen 112 is provided with a fixing column 1127 extending into the strip-shaped groove 1115 and capable of moving in the strip-shaped groove 1115, the fixing column 1127 is arranged on one side far away from the display screen 112 and connected to the rotating arm 113, the fixing column 1127 is positioned in the strip-shaped groove 1115, and the fixing column 1127 may slide in the strip-shaped groove 1115. Meanwhile, the strip-shaped groove 1115 is used to limit the fixing column 1127 to prevent the display screen 112 from being separated from the receiving groove 1116 of the box body 111. When the display screen 112 is unfolded, the fixing column 1127 of the display screen 112 slides from one side close to the rotating arm 113 to a direction far away from the rotating arm 113 to unfold the display screen 112, and the fixing column 1127 of the display screen 112 slide towards the rotating arm 113 to receive the display screen 112 in the receiving groove 1116.

Figure 9:
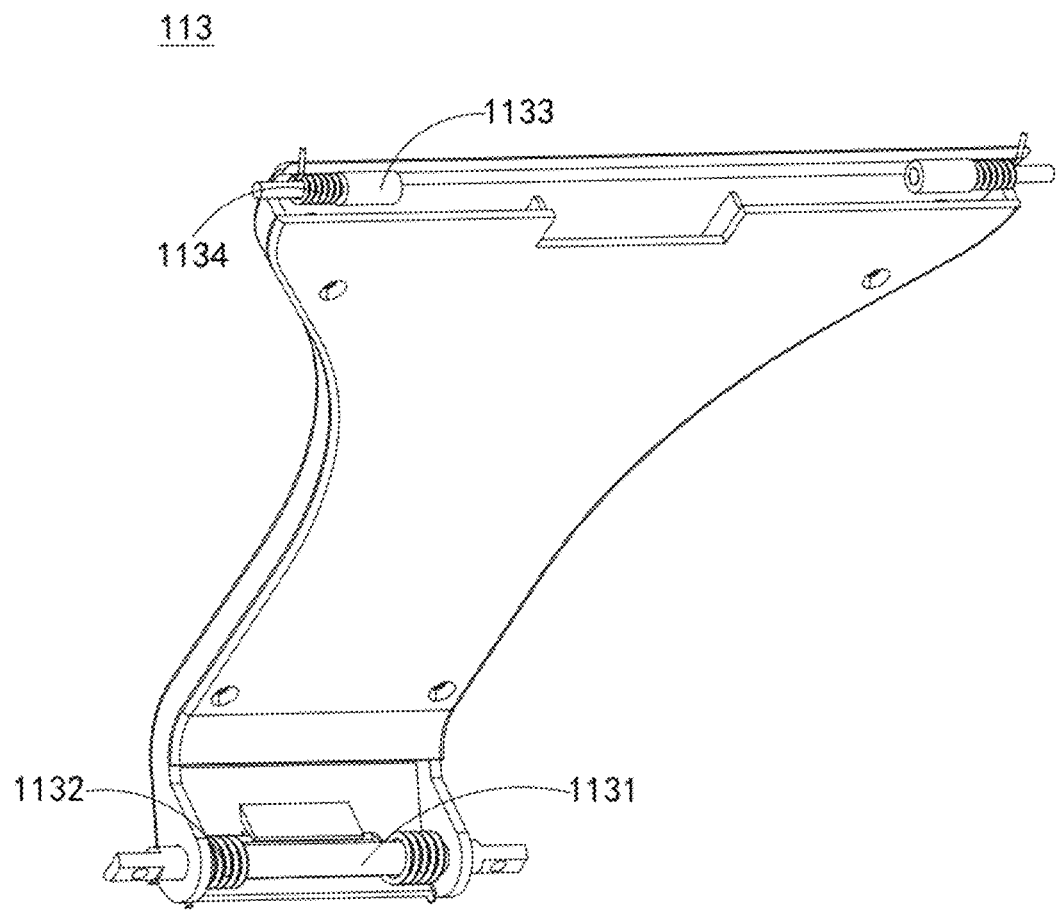
FIG. 9 is a perspective view of a rotating arm of a pipeline endoscopic mechanism according to the present invention.

Referring to FIG. 9, the receiving groove 1116 is also provided with a first mounting groove 1118, the first end of the rotating arm 113 is provided with a first rotating shaft 1131 connected to a side wall of the first mounting groove 1118 and a first return spring 1132 connected to the first rotating shaft 1131 for pressing the rotating arm 113 towards the receiving groove 1116, and the first end of the rotating arm 113 is connected to the first mounting groove 1118 and rotatably connected to the mounting groove by the first rotating shaft 1131. Therefore, the rotating arm 113 is convenient to rotate on the box body 111; in addition, the first end of the rotating arm 113 is arranged in the receiving groove 1116, so that the display screen 112 is convenient to be unfolded or received in the receiving groove 1116, and the length of the rotating arm 113 is reduced. The first return spring 1132 is used to press the rotating arm 113 towards the receiving groove 1116, when the display screen 112 is in an unfolded state, the first return spring 1132 presses the rotating arm 113, and the rotating arm 113 presses the display screen 112 to prevent the display screen 112 from sliding in the receiving groove 1116; and when the display screen 112 is in a received state, the first return spring 1132 presses the rotating arm 113, and the rotating arm 113 presses the display screen 112 to prevent the display screen 112 from being unfolded in the receiving groove 1116.

In this embodiment, when the display screen 112 is in the unfolded state, an angle between the second end of the rotating arm 113 and the display screen 112 is an acute angle, and an angle between the display screen 112 and a bottom wall of the receiving groove 1116 is an acute angle.

Figure 4:
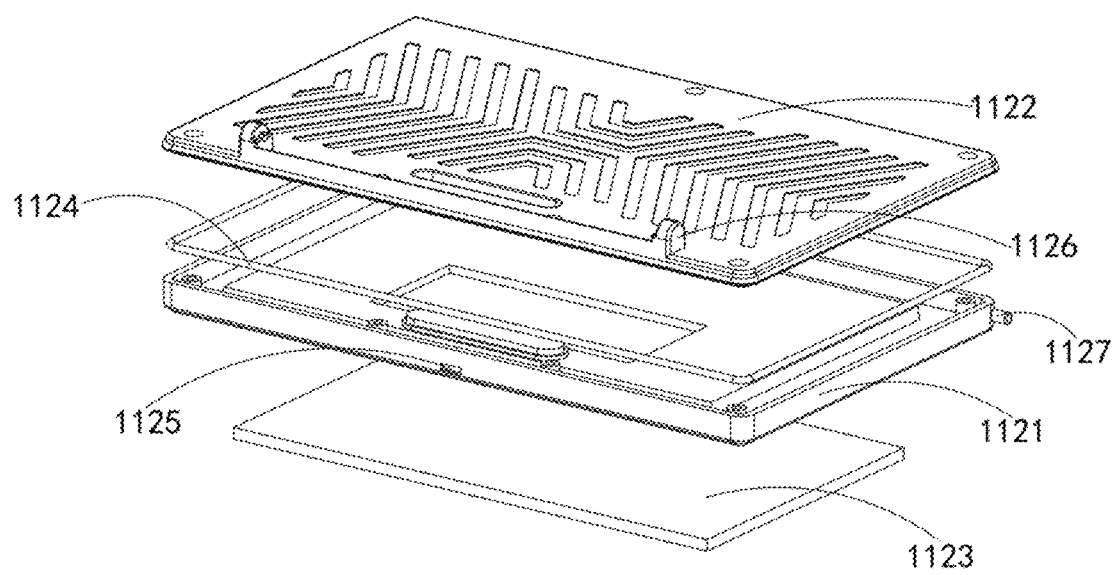
FIG. 4 is an exploded view of a display screen of a pipeline endoscopic mechanism according to the present invention.

Referring to FIG. 4, symmetrical lugs 1126 are provided at a connection between the display screen 112 and the rotating arm 113, and the second end of the rotating arm 113 is provided with a second rotating shaft 1133 rotatably connected to the lug 1126 and a second return spring 1134 connected to the second rotating shaft 1133 for pressing the display screen 112 towards the receiving groove 1116. The lug 1126 is used to connect to the second end of the rotating arm 113, and the second end of the rotating arm 113 is rotatably connected to the lug 1126 by the second rotating shaft 1133, so that the rotating arm 113 is connected to the display screen 112, and the rotating arm 113 is prevented from being separated from the display screen 112. Meanwhile, the second return spring 1134 is used to press the display screen 112, when the display screen 112 is in the received state, the display screen 112 is further prevented from being opened, and when the display screen 112 is in the unfolded state, the second return spring 1134 further prevents the display screen 112 from sliding from the unfolded state to the received state.

The display screen 112 includes a bottom shell 1122, a surface shell 1121 connected to the bottom shell 1122, a display component 1123 connected to the surface shell 1121, and a first waterproof cotton 1124 positioned between the bottom shell 1122 and the surface shell 1121. The bottom shell 1122 and the surface shell 1121 are used to fix the display component 1123, the display component 1123 is used to display an image captured by the camera 12, and the first waterproof cotton 1124 is used to prevent water from entering the display component 1123 and damaging the display component 1123.

Figure 6:
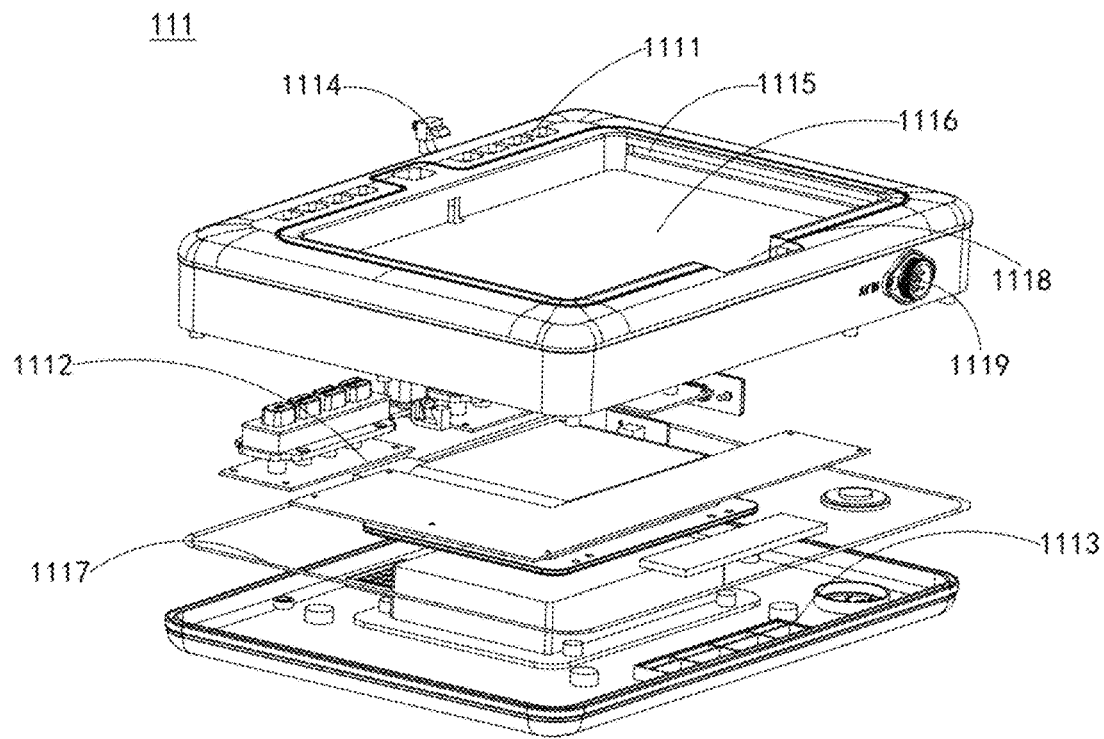
FIG. 6 is an exploded view of a display screen of a pipeline endoscopic mechanism according to the present invention.

Referring to FIG. 6, the box body 111 includes an upper shell 1111, a lower shell 1113, a control component 1112 positioned between the upper shell 1111 and the lower shell 1113 and partially extending to an outer side of the upper shell 1111 and second waterproof cotton 1117 positioned between the upper shell 1111 and the lower shell 1113. The receiving groove 1116 is positioned in the upper shell 1111, the upper shell 1111 and the lower shell 1113 are used to fix the control component 1112, the second waterproof cotton 1117 is used to prevent water stain from entering the control component 1112 and damaging the control component 1112, and the control component 1112 is used to control the display screen 112 and the camera 12.

Figure 8:
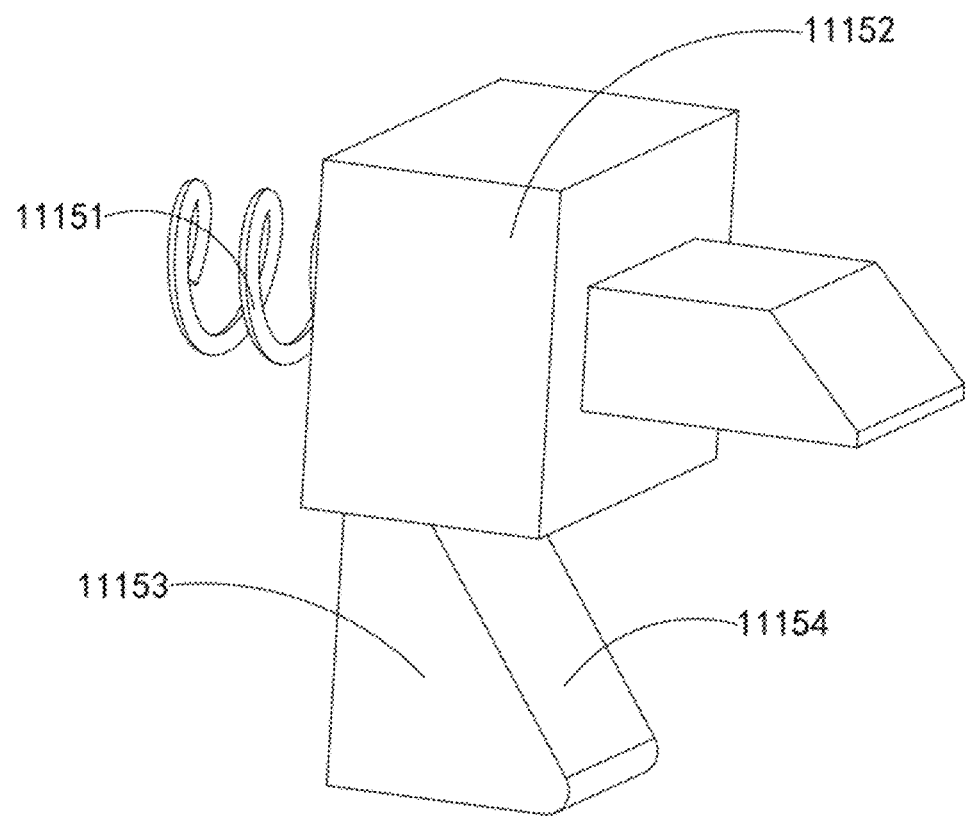
FIG. 8 is a top view of a limiting component of a pipeline endoscopic mechanism according to the present invention.
Figure 11:
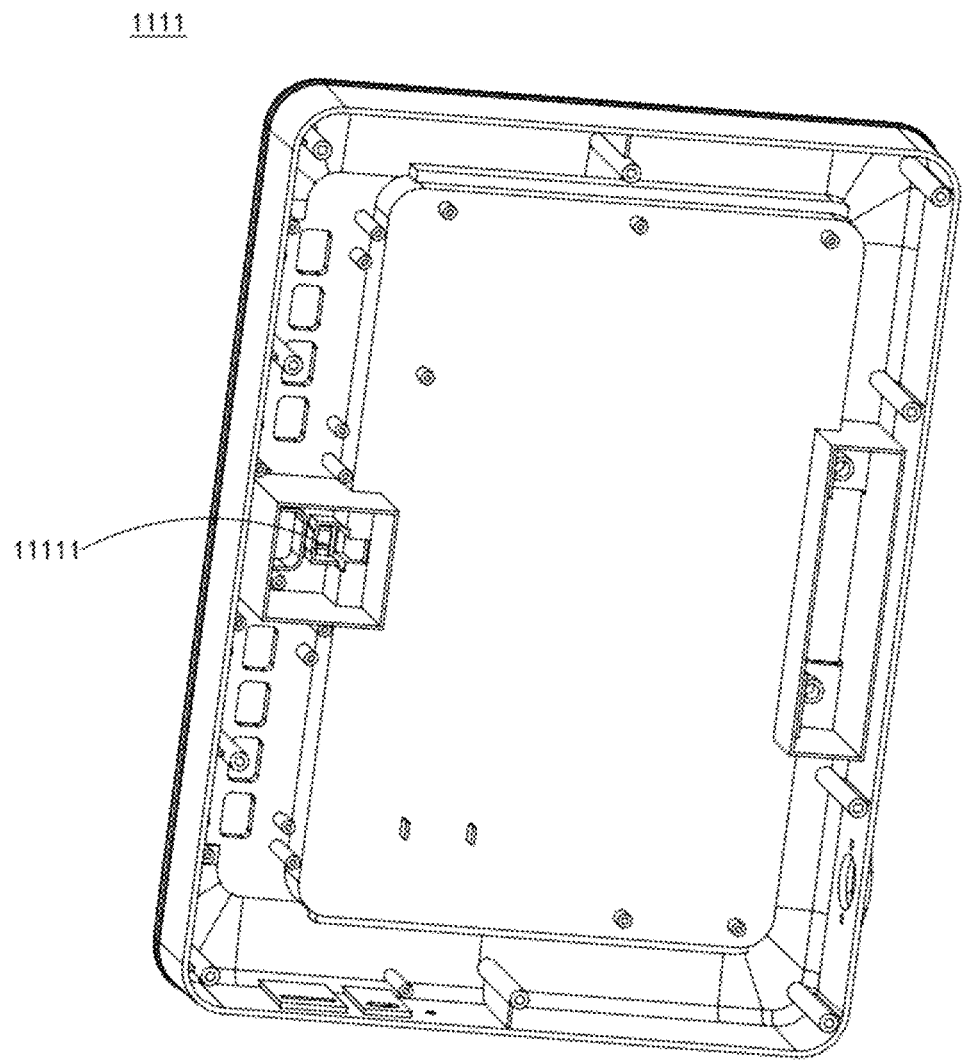
FIG. 11 is a perspective view of a surface shell of a pipeline endoscopic mechanism according to the present invention.

Referring to FIGS. 8 and 11, the upper shell 1111 is provided with a fixing cavity 11111 and a limiting component 1114 connected in the fixing cavity 11111 for clamping the display screen 112, the limiting component 1114 includes a first spring 11151 positioned in the fixing cavity 11111 and an abutment block 11152 abutting against the first spring 11151, the abutment block 11152 partially extends into the receiving groove 1116 when abutting against the display screen 112, a fixing groove 1125 matched with the abutment block 11152 is also provided on one side of the surface shell 1121 close to the rotating arm 113, the limiting component 1114 is used to limit the display screen 112, and the first spring 11151 is used to press the abutment block 11152. When the display screen 112 is received in the receiving groove 1116, the abutment block 11152 extends into the fixing groove 1125 of the display screen 112 when the first spring 11151 presses the abutment block 11152, so that the abutment block 11152 fixes the display screen 112, which further prevents the display screen 112 received in the receiving groove 1116 from moving.

Figure 10:
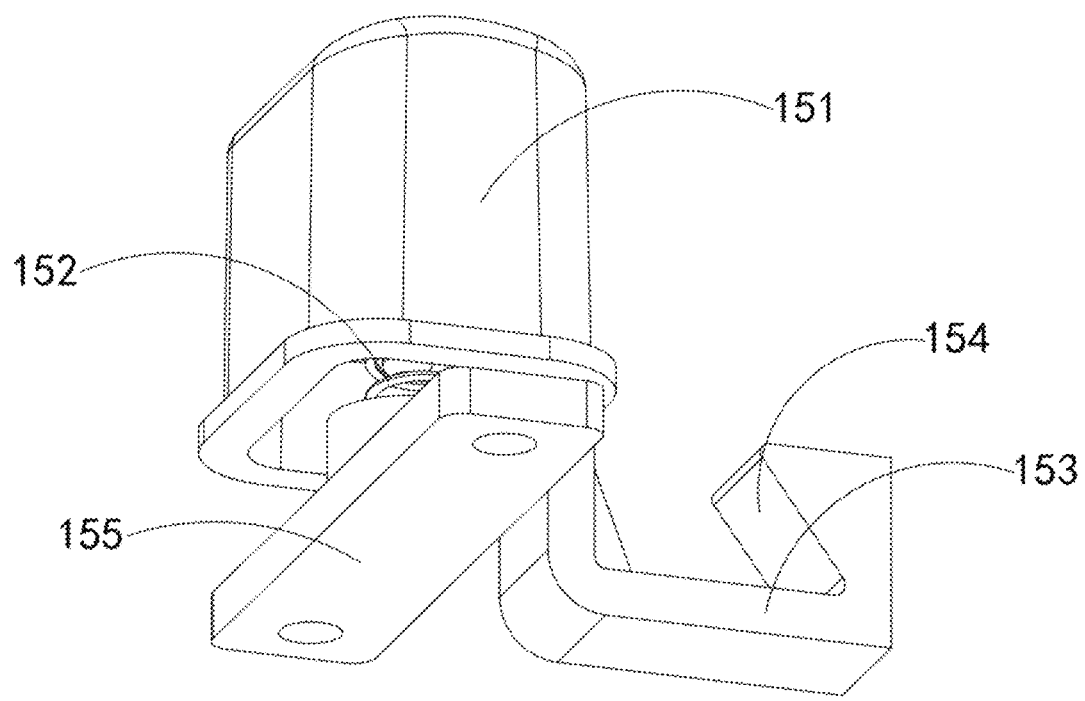
FIG. 10 is a perspective view of an unlocking key of a pipeline endoscopic mechanism according to the present invention.

Referring to FIG. 10, the upper shell 1111 is also provided with an unlocking key 151 positioned on one side of the limiting component 1114, a fixing plate 155 positioned on one side of the unlocking key 151, a second spring 152 positioned between the unlocking key 151 and the fixing plate 155, and an extension block 153 connected to the unlocking key 151 and having one end extending to one side of the abutment block 11152 for driving the abutment block 11152 to move. The fixing plate 155 is used to support the second spring 152 and the unlocking key 151. When the unlocking key 151 unlocks the limiting component 1114, the unlocking key 151 is pressed, the unlocking key 151 moves downwards and drives the extension block 153 to move downwards, and the second spring 152 is deformed due to the support of the fixing plate 155. When the extension block 153 moves downwards, the extension block 153 presses the abutment block 11152 of the limiting component 1114, so that the abutment block 11152 moves away from the display screen 112, therefore, the abutment block 11152 is withdrawn from the display screen 112 to release the limiting of the abutment block 11152 on the display screen 112, thereby facilitating the display screen 112 to be opened.

A first inclined plane 154 is provided on one side of the extension block 153 close to the limiting component 1114, a fixing block 11153 is provided below the abutment block 11152, a second inclined plane 11154 matched with the first inclined plane 154 is provided on one side of the fixing block 11153, and the first inclined plane 154 is attached to the second inclined plane 11154. When the extension block 153 is pressed downwards by the unlocking key 151, the extension block 153 moves down along with the unlocking key 151, and the first inclined plane 154 of the extension block 153 presses the second inclined plane 11154 of the fixing block 11153 while the extension block 153 moves downwards, so that the abutment block 11152 moves away from the display screen 112, the abutment block 11152 is far away from the display screen 112, the limiting of the abutment block 11152 on the display screen 112 is released, and the display screen 112 is conveniently unfolded.

A waterproof aviation connector 1119 is also provided on a rear side of the box body 111. The aviation connector has good sealing performance and may be reused, so as to facilitate the connection between the meter counter box 133 and the box body 111.

Figure 7:
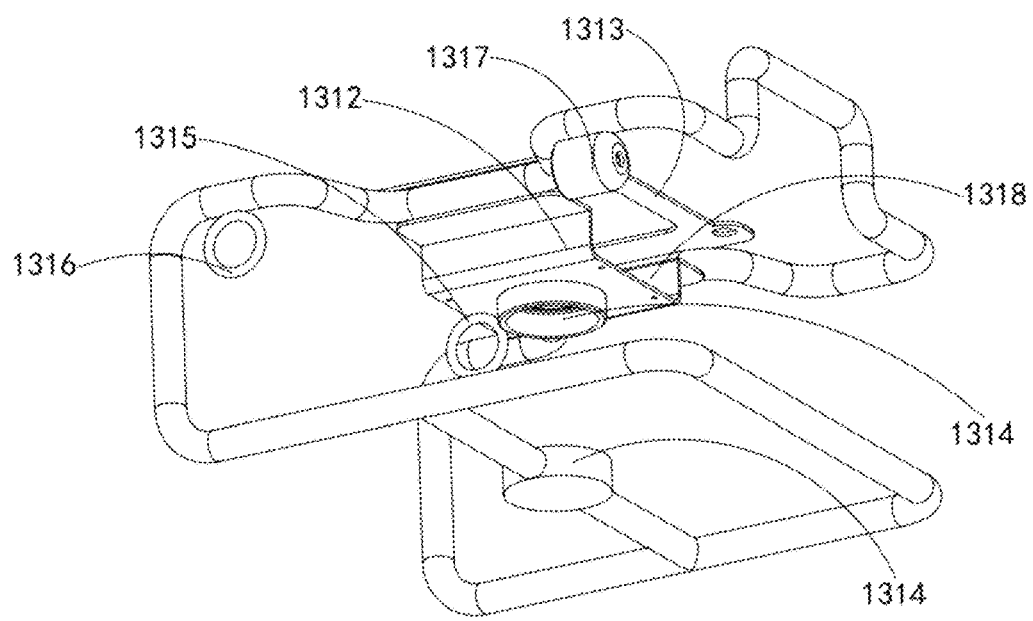
FIG. 7 is a perspective view of a bracket of a pipeline endoscopic mechanism according to the present invention.

Referring to FIG. 7, a wire spool 132 capable of rotating in the bracket 131 is also provided in the bracket 131, the extension cord 121 is wound on a peripheral side of the wire spool 132, the extension cord 121 is wound on the wire spool 132, and the wire spool 132 may rotate in the bracket 131. In one aspect, the extension cord 121 is conveniently stretched to extend an extending distance of the camera 12, and in another aspect, the extension cord 121 is conveniently received, and the physical strength of the user can be effectively saved.

Figure 5:
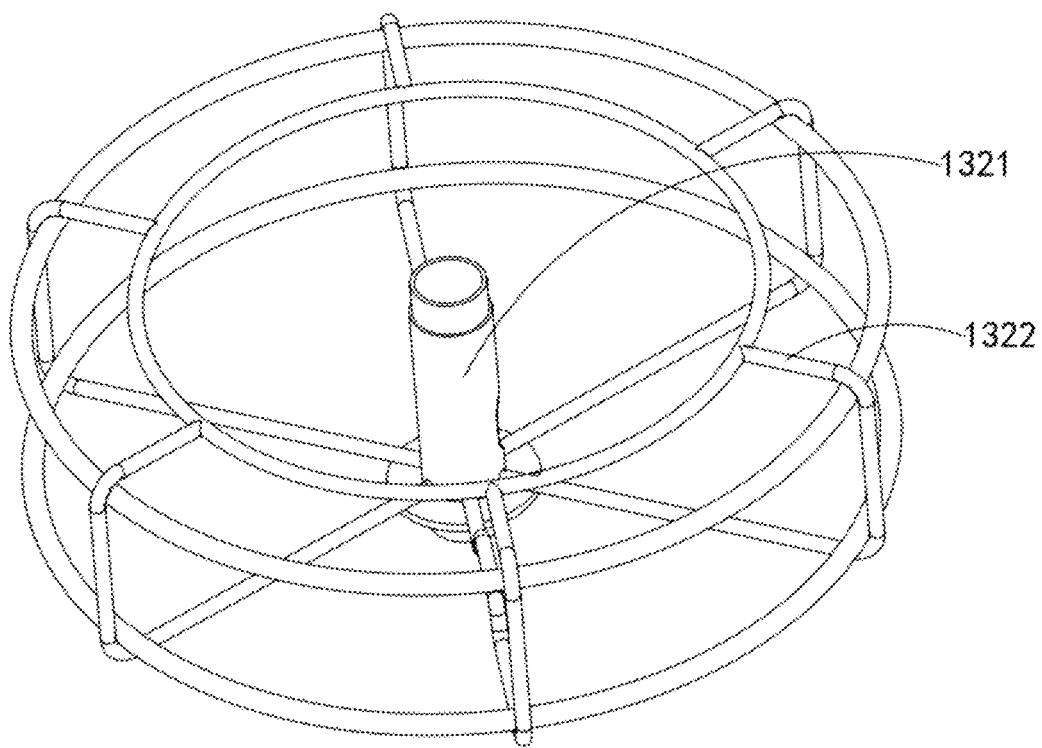
FIG. 5 is a perspective view of a wire spool of a pipeline endoscopic mechanism according to the present invention.

Referring to FIG. 5, the wire spool 132 includes an upright column 1321 connected to the bracket 131 and capable of rotating on the bracket 131 and a fixed disk 1322 positioned on a peripheral side of the upright column 1321 and fixed on the upright column 1321 for winding the extension cord 121. The upright column 1321 is connected to the bracket 131 for rotation, and the fixed disk 1322 is convenient for winding the extension cord 121, so as to receive the extension cord 121.

A first mounting plate 1312 is also provided in the bracket 131, a hollow column 1314 is provided on a bottom of the first mounting plate 1312 and a bottom of the bracket 131 and is positioned relative to the upright column 1321 for rotation, a hollow column 1314 is provided in the bottom of the first mounting plate 1312 and the bracket 131, and the upright column 1321 is connected in the hollow column 1314. The upright column 1321 rotates around the hollow column 1314, so that the wire spool 132 can receive or release the extension cord 121.

A bearing is provided in the hollow column 1314, the upright column 1321 is connected in the bearing, and the bearing is used to reduce a friction degree between the upright column 1321 and the hollow column 1314, so that the upright column 1321 can rotate more smoothly in a hollow shaft. Meanwhile, the bearing may also maintain a balancing effect of connecting the upright column 1321 to the hollow column 1314.

A center position of the first mounting plate 1312 is recessed towards a bottom of the bracket 131 to form a second mounting groove 1318, the meter counter box 133 is positioned in the second mounting groove 1318, the second mounting groove 1318 is used to mount the meter counter box 133, and the second mounting groove 1318 is recessed towards the bottom of the bracket 131. In one aspect, the upright column 1321 is conveniently connected to a bottom of the second mounting groove 1318, and in another aspect, the meter counter box 133 is arranged in the second mounting groove 1318 to reduce an overall size of the base device 13.

A second mounting plate 1313 is also provided on a top of the bracket 131 to limit the meter counter box 133 in the second mounting groove, the box body 111 is fixed on the bracket 131 by the second mounting plate 1313, and the second mounting plate 1313 is used to limit the meter counter box 133 in the mounting groove, so that the appearance of the bracket 131 is more attractive. Meanwhile, the box body 111 is fixed to the bracket 131 by the second mounting plate 1313, which is convenient for fixing the box body 111.

The first mounting plate 1312 is provided with a first limiting ring 1315 through which the extension cord 121 passes and used to limit the extension cord 121. The first limiting ring 1315 is used to limit the extension cord 121, fix the position of the extension cord 121 for coming out and winding up, prevent the extension cord 121 from being disordered when coming out or winding up, and facilitate winding up or coming out of the extension cord 121.

An outer side of the bracket 131 is also provided with a second limiting ring 1316 through which the extension cord 121 passes for limiting the extension cord 121, the extension cord 121 passes through the second limiting ring 1316 after passing through the first limiting ring 1315, and the second limiting ring 1316 is used to further limit the coming out or winding up of the extension cord 121, and ensure the coming out or winding up of the extension cord 121 from a fixed direction and position.

An outer side of the bracket 131 is also provided with a sleeve 1317 sleeved with the camera 12, and the sleeve 1317 is used to sleeve the camera 12. When the camera 12 is not used, the camera 12 is sleeved in the sleeve 1317, so that the camera 12 can be effectively prevented from being stepped on by a user by mistake, and meanwhile, the camera 12 is received in the sleeve 1317, so that the appearance of the pipeline endoscopic mechanism is more attractive.

The sleeve 1317 and the second limiting ring 1316 are positioned on the same side of the bracket 131. When the extension cord 121 is received in the wire spool 132, the camera 12 can be extended into the sleeve 1317, the sleeve 1317 receives the camera 12, the camera 12 is prevented from being randomly placed when the camera 12 is not used, damage to the camera 12 is reduced, and therefore the service life of the camera 12 is prolonged.

Rationale:

The pipeline endoscopic mechanism is in a received position. When the pipeline endoscopic mechanism is used, firstly, the unlocking key 151 is pressed, the extension block 153 of the unlocking key 151 drives the abutment block 11152 to retract, so as to release the limit of the abutment block 11152 on the display screen 112, the second end of the rotating arm 113 is lifted away from the receiving groove 1116, and the first end of the rotating arm 113 rotates in the mounting groove; when the rotating arm 113 rotates, the second end of the rotating arm 113 drives the display screen 112 to move away from the receiving groove 1116; since one side of the display screen 112 far away from the second end of the rotating arm 113 is connected in the strip-shaped groove 1115 of the receiving groove 1116, the fixing column 1127 of the display screen 112 moves away from the rotating arm 113; when one side of the display screen 112 close to the fixing column 1127 is positioned at one side of the receiving groove 1116 close to the limiting component 1114, the display screen 112 stops moving; in this case, the first return spring 1132 of the rotating arm 113 presses the second end of the rotating arm 113 towards the receiving groove 1116, the second return spring 1134 of the rotating arm 113 presses the display screen 112 towards the receiving groove 1116, so as to limit the display screen 112, so that the display screen 112 is clamped in the receiving groove 1116 at a fixed angle, which is convenient for a user to view the display screen 112, and the camera 12 can be extended into the pipeline for capturing. When the use of the pipeline endoscopic mechanism is completed and the display screen 112 is received, the fixing column 1127 of the display screen 112 slides towards the first end of the rotating arm 113, a display surface of the display screen 112 moves towards a bottom wall of the receiving groove 1116, and the display screen 112 drives the second end of the rotating arm 113 to move; and when the display surface of the display screen 112 is attached to the bottom wall of the receiving groove 1116, the abutment block 11152 is clamped in the fixing groove 1125 of the display screen 112, so as to limit the display screen 112 and prevent the display screen 112 from being unfolded. Through the above structure, when a video captured by the camera 12 of the pipeline endoscopic mechanism is viewed, there is no need to open the box body 111, and the display screen 112 received in the box body 111 may be unfolded. After use, the display screen 112 is received in the receiving groove 1116, which can effectively reduce the volume of the pipeline endoscopic mechanism. Meanwhile, there is no need to overturn the box body 111 during use or close the box body 111 after use, so that the use is more convenient.

In conclusion, although the present invention has been disclosed above with preferred embodiments, the above preferred embodiments are not intended to limit the present invention, and those of ordinary skill in the art can make various changes and modifications without departing from the spirit and scope of the present invention. Therefore, the protection scope of the present invention shall be subject to the scope defined by the claims.

What is claimed is:

1. A pipeline endoscopic mechanism, comprising:
a host,
a camera connected to the host via an extension cord, and
a base device positioned below the host,
wherein the extension cord is wound around the base device, the base device comprises a bracket for fixing the host and a meter counter box connected to the bracket and connected to the host, and the host comprises a box body with a receiving groove, a rotating arm with a first end rotatably connected to one side of the receiving groove, and a display screen rotatably connected to a second end of the rotating arm and capable of being unfolded or received in the receiving groove;
wherein strip-shaped grooves are symmetrically provided on two opposite sides of the receiving groove, the display screen is provided with a fixing column extending into the strip-shaped groove and capable of moving in the strip-shaped groove, and the fixing column is arranged on one side far away from the display screen and connected to the rotating arm.

2. The pipeline endoscopic mechanism according to claim 1, wherein the receiving groove is also provided with a first mounting groove, and the first end of the rotating arm is provided with a first rotating shaft connected to a side wall of the first mounting groove and a first return spring connected to the first rotating shaft for pressing the rotating arm towards the receiving groove.

3. The pipeline endoscopic mechanism according to claim 1, wherein symmetrical lugs are provided at a connection between the display screen and the rotating arm, and the second end of the rotating arm is provided with a second rotating shaft rotatably connected to the lug and a second return spring connected to the second rotating shaft for pressing the display screen towards the receiving groove.

4. The pipeline endoscopic mechanism according to claim 1, wherein the display screen comprises a bottom shell, a surface shell connected to the bottom shell, a display component connected to the surface shell, and a first waterproof cotton positioned between the bottom shell and the surface shell.

5. The pipeline endoscopic mechanism according to claim 4, wherein the box body comprises an upper shell, a lower shell, a control component positioned between the upper shell and the lower shell and partially extending to an outer side of the upper shell and second waterproof cotton positioned between the upper shell and the lower shell, and the receiving groove is positioned in the upper shell.

6. The pipeline endoscopic mechanism according to claim 5, wherein the upper shell is provided with a fixing cavity and a limiting component connected in the fixing cavity for clamping the display screen; and the limiting component comprises a first spring positioned in the fixing cavity and an abutment block abutting against the first spring, a fixing groove matched with the abutment block is also provided on one side of the surface shell close to the rotating arm, and the abutment block partially extends into the receiving groove when abutting against the display screen.

7. The pipeline endoscopic mechanism according to claim 6, wherein the upper shell is also provided with an unlocking key positioned on one side of the limiting component, a fixing plate positioned on one side of the unlocking key, a second spring positioned between the unlocking key and the fixing plate, and an extension block connected to the unlocking key and having one end extending to one side of the abutment block for driving the abutment block to move.

8. The pipeline endoscopic mechanism according to claim 7, wherein a first inclined plane is provided on one side of the extension block close to the limiting component; and a fixing block is provided below the abutment block, and a second inclined plane matched with the first inclined plane is provided on one side of the fixing block.

9. The pipeline endoscopic mechanism according to claim 8, wherein a waterproof aviation connector is also provided on a rear side of the box body.

10. The pipeline endoscopic mechanism according to claim 9, wherein a wire spool capable of rotating in the bracket is also provided in the bracket, and the extension cord is wound on a peripheral side of the wire spool.

11. The pipeline endoscopic mechanism according to claim 10, wherein the wire spool comprises an upright column connected to the bracket and capable of rotating on the bracket and a fixed disk positioned on a peripheral side of the upright column and fixed on the upright column for winding the extension cord.

12. The pipeline endoscopic mechanism according to claim 11, wherein a first mounting plate is also provided in the bracket, and a hollow column is provided on a bottom of the first mounting plate and a bottom of the bracket and is positioned relative to the upright column for rotation.

13. The pipeline endoscopic mechanism according to claim 12, wherein a bearing is provided in the hollow column, and the upright column is connected in the bearing.

14. The pipeline endoscopic mechanism according to claim 12, wherein a center position of the first mounting plate is recessed towards a bottom of the bracket to form a second mounting groove, and the meter counter box is positioned in the second mounting groove.

15. The pipeline endoscopic mechanism according to claim 14, wherein a second mounting plate is also provided on a top of the bracket to limit the meter counter box in the second mounting groove, and the host is fixed on the bracket by the second mounting plate.

16. The pipeline endoscopic mechanism according to claim 12, wherein the first mounting plate is provided with a first limiting ring through which the extension cord passes and used to limit the extension cord.

17. The pipeline endoscopic mechanism according to claim 1, wherein an outer side of the bracket is also provided with a second limiting ring through which the extension cord passes for limiting the extension cord.

18. The pipeline endoscopic mechanism according to claim 17, wherein an outer side of the bracket is also provided with a sleeve sleeved with the camera.

19. The pipeline endoscopic mechanism according to claim 18, wherein the sleeve and the second limiting ring are positioned on the same side of the bracket.

20. A pipeline endoscopic mechanism, comprising:
a host,
a camera connected to the host via an extension cord, and
a base device positioned below the host,
wherein the extension cord is wound around the base device, the base device comprises a bracket for fixing the host and a meter counter box connected to the bracket and connected to the host, and the host comprises a box body with a receiving groove, a rotating arm with a first end rotatably connected to one side of the receiving groove, and a display screen rotatably connected to a second end of the rotating arm and capable of being unfolded or received in the receiving groove;
wherein the display screen comprises a bottom shell, a surface shell connected to the bottom shell, a display component connected to the surface shell, and a first waterproof cotton positioned between the bottom shell and the surface shell;
wherein the box body comprises an upper shell, a lower shell, a control component positioned between the upper shell and the lower shell and partially extending to an outer side of the upper shell and second waterproof cotton positioned between the upper shell and the lower shell, and the receiving groove is positioned in the upper shell;
wherein the upper shell is provided with a fixing cavity and a limiting component connected in the fixing cavity for clamping the display screen; and the limiting component comprises a first spring positioned in the fixing cavity and an abutment block abutting against the first spring, a fixing groove matched with the abutment block is also provided on one side of the surface shell close to the rotating arm, and the abutment block partially extends into the receiving groove when abutting against the display screen.

* * * * *